Feb. 20, 1968  J D. COFFMAN ET AL  3,369,399
MEASURING CHAMBER BRIDGE FOR USE IN WATER METERS
Filed May 6, 1965

J. D. COFFMAN
WILFORD G. BROWN
INVENTORS

BY Daniel H. Bobis
Atty.

United States Patent Office 3,369,399
Patented Feb. 20, 1968

3,369,399
MEASURING CHAMBER BRIDGE FOR USE
IN WATER METERS
J. D. Coffman and Wilford G. Brown, Fort Worth, Tex.,
assignors to Worthington Corporation, Harrison, N.J.,
a corporation of Delaware
Filed May 6, 1965, Ser. No. 453,739
1 Claim. (Cl. 73—272)

ABSTRACT OF THE DISCLOSURE

A measuring chamber bridge for use in water meters. The bridge is constructed from a metal reinforced, plastic material and comprises a perforated, metal reinforcing member surrounded and completely enclosed by a plastic body member which is formed by flowing the plastic, in the liquid state over the reinforcing member and allowing it to harden.

This invention relates to new and improved measuring chamber bridges for use in water meters of the oscillating piston type and, more particularly, to measuring chamber bridges as above of reinforced construction.

In the past, measuring chamber bridges for use in water meters of the oscillating piston type have been of one piece, metallic construction, and have been made, for example, from such materials as extruded and burnished Monel metal. Water meters utilizing measuring chamber bridges of this construction have proven noisy in operation and susceptible to increasing inaccuracy due to wear of the said measuring chamber bridge and oscillating piston upon extended use of said meters.

A primary cause of noise in the operation of the said water meters has been determined to be the sound made upon contact between the oscillating piston and measuring chamber bridge, as water flowing through the meter causes movement of the said piston relative to the said bridge. In addition, the flow of water through the meter during the normal operation thereof causes the piston to slide against the bridge resulting in wear of the contacting surfaces, whereby the noise problem grows progressively worse as does the decrease in accuracy of the meter. It is, therefore, an object of this invention to provide a measuring chamber bridge of a material soft enough to deaden the sound caused by measuring chamber bridge-oscillating piston contact during operation of a water meter, and to materially reduce wear of the said piston caused by said contact.

Another object of the invention is the provision of a measuring chamber bridge as above which exhibits sufficient inherent firmness to retain its shape and size during extended operation of a water meter.

A further object of the invention is the provision of a measuring chamber bridge as above which exhibits good resistance to wear in the nature of tearing or abrasion, notwithstanding the sound deadening characteristics thereof.

Another object of the invention is the provision of a measuring chamber bridge as above which exhibits a very low coefficient of friction, whereby frictional resistance to the operation of a water meter is minimized.

Another object of the invention is the provision of a measuring chamber bridge as above which exhibits outstanding resistance to water swelling and electrolytic erosion.

A still further object of the invention is the provision of a measuring chamber bridge as above which comprises a body member of a readily available material of suitable sound deadening, strength and electrolytic erosion characteristics, and a reinforcing member positioned therein of a readily available material of suitable strength and electrolytic erosion characteristics.

In a herein disclosed preferred embodiment, the measuring chamber bridge is constructed from a metal reinforced, plastic material, and comprises a perforated, metal reinforcing member which is surrounded and completely enclosed by a plastic body member which is flowed thereover in the liquid state, and allowed to harden thereover to form the said bridge.

The above and other objects and advantages of the invention are believed made clear by the following detailed description thereof taken in conjunction with the accompanying drawings therein:

Figures 1, 2, 3, 4:
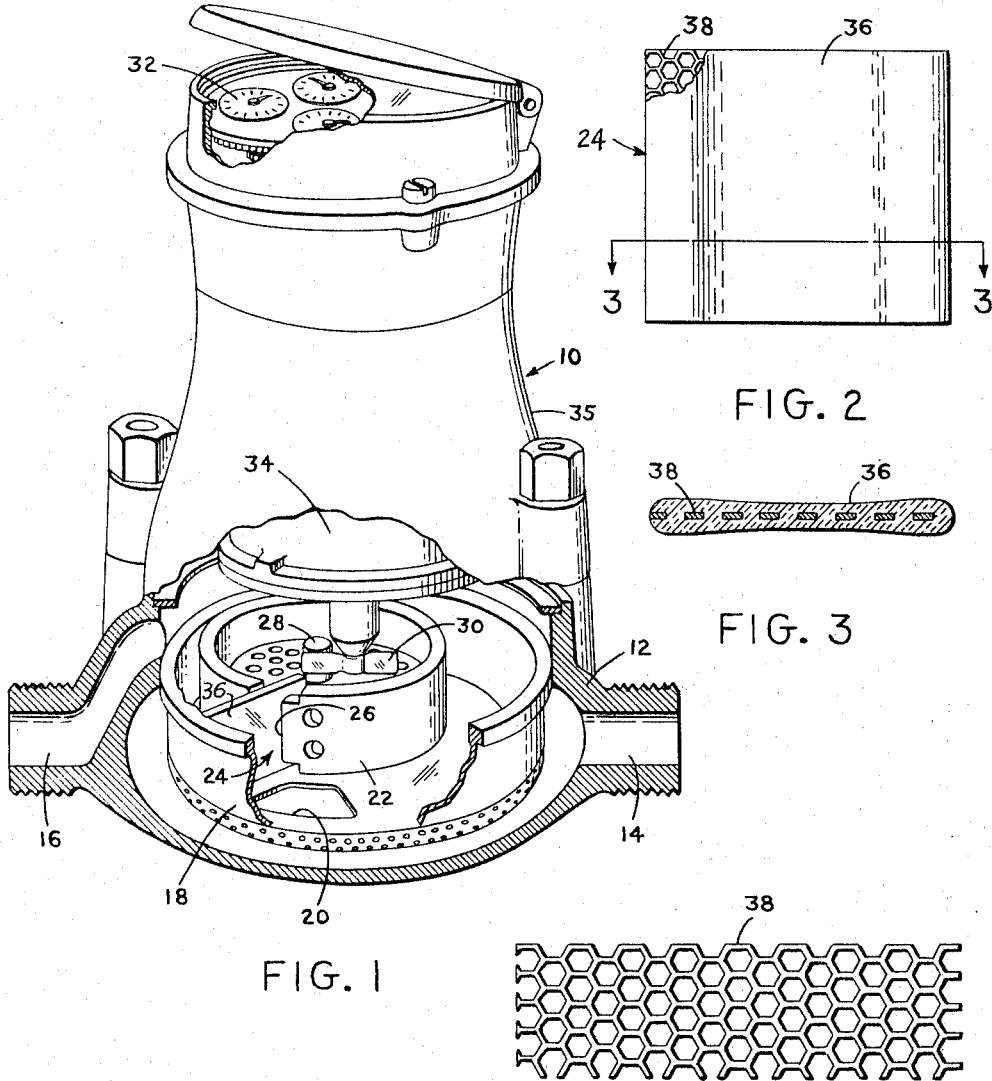
FIGURE 1 is a perspective view, with parts in section and portions broken away for purposes of illustration, of a water meter of the oscillating piston type utilizing the new and improved measuring chamber bridge of the invention.
FIGURE 2 is a front elevational view, with a portion cut away for purposes of illustration, of the measuring chamber bridge of the water meter of FIGURE 1.
FIGURE 3 is a cross-sectional view taken along line 3—3 in FIGURE 2.
FIGURE 4 is a fragmentary view of the reinforcing member utilized in the bridge of FIGURES 2 and 3.

Referring now to the drawings, a water meter of the oscillating piston type is generally indicated at 10 in FIGURE 1 and may, for example, be of the type manufactured by the Calmet Meter Division of the Worthington Corporation and designated thereby as the model AC or model BC. The construction and manner of operation of water meters of this type are believed well known in this art and will not be described in detail herein. Thus, briefly described, the water meter 10 comprises a lower casing 12 within which is formed a water inlet 14 and a water outlet 16 respectively. A measuring chamber 18 is supported as shown within the casing 12 and includes an inlet port 20 formed therein as shown, in fluid flow communication with the water inlet 14, and a non-illustrated outlet port formed therein in fluid flow communication with the water outlet 16.

An oscillating piston 22 of the semi-floating type is positioned as shown within the measuring chamber 18 with freedom for oscillatory movement relative thereto, and a measuring chamber bridge, generally indicated at 24, extends as shown from the wall of the measuring chamber 18 through a slot 26 in the wall of the oscillating piston 22 to create a seal between the inlet and outlet sides of the measuring chamber 18 to prevent water from flowing through the said chamber without moving the piston 22. In addition, the cooperation between the walls of the measuring chamber bridge 24 and the slot 26 formed in the oscillating piston 22 keeps the said piston from rotating, forcing it instead to make the proper oscillating motion upon the flow of water through the meter.

A post 28 extends upwardly as shown from the piston 22 into contact with a driver member 30, which driver member in turn drives a set of indicating dials 32 through a gear train 34 connected therebetween in an upper casing 35. Thus may be readily understood whereby the flow of water through the measuring chamber 18 will result in oscillation of piston 22 about measuring chamber bridge 24, with resultant drive of driver member 30 and attendant indication on the indicating dial 32 of the quantity of liquid which has flowed through the water meter 10. In addition, the oscillation of the piston 22 about the bridge 24 may be understood to result in intermittent sliding contact between the respective side walls of the said bridge and the respective side walls of the slot 26 formed in the said piston.

Referring now to FIGURES 2 and 3, the measuring chamber bridge 24 may be seen to comprise a body member 36, shaped as shown, with a reinforcing member or insert 38 positioned therewithin in the depicted manner. As seen in FIGURES 2 and 4, the said reinforcing member is of generally perforated construction, and is made from any readily available material of suitable strength and electrolytic erosion resistant characteristics, as for example, stainless steel.

The body member 36 is made from any readily available material which is soft enough to deaden the sound of the contact between the bridge 24 and oscillating piston 22 and accordingly reduce the wear of the latter, while at the same time, exhibiting suitable strength, electrolytic erosion resistant, and low coefficient of friction characteristics to insure extended periods of accurate operation of the meter 10. Durable and readily available plastic materials, as for example polyurethane elastomers, have proven particularly satisfactory in the construction of the body member 36.

The measuring chamber bridge 24 is constructed by mounting the reinforcing member 38 in any convenient manner, as for example in a special mold, heating the plastic material of the body member 36 to liquify the same, flowing the liquified plastic material into the said mold whereby it will flow around the said reinforcing member and into and through the perforations formed therein to completely enclose the said reinforcing member, and allowing the liquified plastic material to harden to complete the formation of the measuring chamber bridge.

Thus is believed made clear whereby the new and improved measuring chamber bridge of the invention provides for extended periods of substantially noiseless, highly accurate operation of water meters of the oscillating piston type.

It will be understood that the invention is not to be limited to the specific construction or arrangement of parts shown but that they may be widely modified within the invention defined by the claim.

What is claimed is:

1. In a water meter, a measuring chamber having a water inlet and a water outlet, an oscillating piston positioned in said measuring chamber, and a measuring chamber bridge extending between a wall of said chamber and said piston intermediate said water inlet and water outlet, said measuring chamber bridge comprising a body member of abrasion resistant polyurethane elastomer having a hardness value above 30 on the Shore "D" Durometer hardness scale, and a perforated stainless steel reinforcing member positioned within said body member with said body member extending into said perforations of said reinforcing member.

References Cited

UNITED STATES PATENTS 2,735,408   2/1956   Rochford et al. _____ 91—70 X

RICHARD C. QUEISSER, *Primary Examiner.*

JAMES J. GILL, *Examiner.*

E. GILHOOLY, *Assistant Examiner.*